(12) United States Patent
Sutherland et al.

(10) Patent No.: US 11,797,398 B2
(45) Date of Patent: Oct. 24, 2023

(54) SYSTEMS AND METHODS FOR CHECKING SAFETY PROPERTIES

(71) Applicant: Dover Microsystems, Inc., Wayland, MA (US)

(72) Inventors: Andrew Sutherland, Portland, OR (US); Jonathan B. Rosenberg, Wayland, MA (US); Gregory T. Sullivan, Auburndale, MA (US)

(73) Assignee: Dover Microsystems, Inc., Wayland, MA (US)

( * ) Notice: Subject to any disclaimer, the term of this patent is extended or adjusted under 35 U.S.C. 154(b) by 282 days.

(21) Appl. No.: 17/051,741

(22) PCT Filed: Apr. 30, 2019

(86) PCT No.: PCT/US2019/029880
§ 371 (c)(1),
(2) Date: Oct. 29, 2020

(87) PCT Pub. No.: WO2019/213061
PCT Pub. Date: Nov. 7, 2019

(65) Prior Publication Data
US 2021/0406137 A1    Dec. 30, 2021

Related U.S. Application Data

(60) Provisional application No. 62/664,554, filed on Apr. 30, 2018.

(51) Int. Cl.
*G06F 11/14* (2006.01)
*G06F 9/448* (2018.01)
(Continued)

(52) U.S. Cl.
CPC ........ *G06F 11/1479* (2013.01); *G06F 9/3885* (2013.01); *G06F 9/4498* (2018.02); *G06F 21/51* (2013.01); *G06F 21/52* (2013.01)

(58) Field of Classification Search
CPC ............... G06F 11/1479; G06F 9/3885; G06F 9/4498; G06F 21/51; G06F 21/52
(Continued)

(56) References Cited

U.S. PATENT DOCUMENTS 5,201,056 A    4/1993 Daniel et al.
5,377,336 A    12/1994 Eickemeyer et al.
(Continued)

FOREIGN PATENT DOCUMENTS

CN    101558388 A    10/2009
CN    102160033 A    8/2011
(Continued)

OTHER PUBLICATIONS

U.S. Appl. No. 16/966,616, filed Jul. 31, 2020, Boling et al.
(Continued)

*Primary Examiner* — Yair Leibovich
(74) *Attorney, Agent, or Firm* — Wolf, Greenfield & Sacks, P.C.

(57) ABSTRACT

In some embodiments, a system is provided, comprising enforcement hardware configured to execute, at run time, a state machine in parallel with application code. Executing the state machine may include maintaining metadata that corresponds to one or more state variables of the state machine; matching instructions in the application code to transitions in the state machine; and, in response to determining that an instruction in the application code does not match any transition from a current state of the state machine, causing an error handling routine to be executed. In some embodiments, a description of a state machine may be translated into at least one policy to be enforced at run time based on metadata labels associated with application code and/or data manipulated by the application code.

25 Claims, 6 Drawing Sheets

(51) Int. Cl.
*G06F 9/38* (2018.01)
*G06F 21/51* (2013.01)
*G06F 21/52* (2013.01)

(58) Field of Classification Search
USPC .......................................................... 714/15
See application file for complete search history.

(56) References Cited

U.S. PATENT DOCUMENTS

| | | | |
|---|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 9,967,272 B1 * | 5/2018 | Khanna ................. G06F 16/951 |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B2 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |

(56) References Cited

U.S. PATENT DOCUMENTS

| | | |
|---|---|---|
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1* | 8/2008 | Rowley ................. G06Q 10/06 |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |

(56) References Cited

U.S. PATENT DOCUMENTS

| | | |
|---|---|---|
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1* | 5/2019 | Shimizu ............ H04L 63/1441 |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A1 | 6/2017 |
| WO | WO 2017/106103 A2 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

U.S. Appl. No. 17/711,092, filed Apr. 1, 2022, Boling et al.
U.S. Appl. No. 16/966,863, filed Jul. 31, 2020, Milburn et al.
U.S. Appl. No. 16/966,865, filed Jul. 31, 2020, Milburn et al.
U.S. Appl. No. 17/774,799, filed May 5, 2022, Sutherland et al.
U.S. Appl. No. 17/507,398, filed Oct. 21, 2021, Milburn et al.
U.S. Appl. No. 17/292,694, filed May 10, 2021, Boling et al.
U.S. Appl. No. 17/312,675, filed Jun. 10, 2021, Sullivan et al.
U.S. Appl. No. 17/423,701, filed Jul. 16, 2021, Sutherland et al.
U.S. Appl. No. 16/966,866, filed Jul. 31, 2020, Boling et al.
U.S. Appl. No. 17/720,035, filed Apr. 13, 2022, Boling et al.
U.S. Appl. No. 17/560,975, filed Dec. 23, 2021, Boling et al.
U.S. Appl. No. 17/769,868, filed Apr. 18, 2022, Boling et al.
U.S. Appl. No. 17/308,868, filed May 5, 2021, Milburn et al.
U.S. Appl. No. 15/168,689, filed May 31, 2016, DeHon et al.
U.S. Appl. No. 15/426,098, filed Feb. 7, 2017, DeHon.
U.S. Appl. No. 15/624,878, filed Jun. 16, 2017, DeHon et al.
U.S. Appl. No. 15/695,541, filed Sep. 5, 2017, DeHon.
U.S. Appl. No. 16/002,642, filed Jun. 7, 2018, DeHon et al.
U.S. Appl. No. 16/002,757, filed Jun. 7, 2018, DeHon et al.
U.S. Appl. No. 16/002,957, filed Jun. 7, 2018, DeHon.
U.S. Appl. No. 16/002,987, filed Jun. 7, 2018, DeHon.
U.S. Appl. No. 16/062,791, filed Jun. 15, 2018, DeHon et al.
U.S. Appl. No. 16/256,640, filed Jan. 24, 2019, DeHon et al.
U.S. Appl. No. 16/684,172, filed Nov. 14, 2019, DeHon.
U.S. Appl. No. 16/905,680, filed Jun. 18, 2020, DeHon.
U.S. Appl. No. 16/929,692, filed Jul. 15, 2020, DeHon.
U.S. Appl. No. 16/062,796, filed Jun. 15, 2018, DeHon et al.
U.S. Appl. No. 16/264,773, filed Feb. 1, 2019, Milburn et al.
U.S. Appl. No. 17/474,830, filed Sep. 14, 2021, Milburn et al.
U.S. Appl. No. 17/452,271, filed Oct. 26, 2021, DeHon.
PCT/US2019/016272, Apr. 8, 2019, International Search Report and Written Opinion.
PCT/US2019/016272, Aug. 13, 2020, International Preliminary Report on Patentability.
PCT/US2019/016276, Apr. 26, 2019, International Search Report and Written Opinion.

(56) References Cited

OTHER PUBLICATIONS

PCT/US2019/016276, Aug. 13, 2020, International Preliminary Report on Patentability.
PCT/US2019/029880, Aug. 8, 2019, International Search Report and Written Opinion.
PCT/US2019/029880, Nov. 12, 2020, International Preliminary Report on Patentability.
PCT/US2019/016317, Apr. 16, 2019, International Search Report and Written Opinion.
PCT/US2019/016317, Aug. 13, 2020, International Preliminary Report on Patentability.
PCT/US2020/059057, Feb. 8, 2021, International Search Report and Written Opinion.
PCT/US2016/066188, Jul. 13, 2017, International Search Report and Written Opinion.
PCT/US2016/066194, Apr. 7, 2017, International Search Report and Written Opinion.
PCT/US2019/016242, Mar. 29, 2019, International Search Report and Written Opinion.
PCT/US2019/060030, May 20, 5021, International Search Report and Written Opinion.
PCT/US2019/060698, May 20, 2021, International Search Report and Written Opinion.
PCT/US2019/067084, Jul. 2, 2021, International Search Report and Written Opinion.
PCT/US2019/013678, Apr. 15, 2020, Invitation to Pay Additional Fees.
PCT/US2019/013678, Jul. 29, 2021, International Search Report and Written Opinion.
PCT/US2019/016295, May 3, 2019, Invitation to Pay Additional Fees.
PCT/US2019/016295, Jun. 26, 2019, International Search Report and Written Opinion.
PCT/US2019/016295, Aug. 13, 2020, International Preliminary Report on Patentability.
PCT/US2021/020602, May 11, 2021, International Search Report and Written Opinion.
PCT/US2020/055952, Jan. 28, 2021, International Search Report and Written Opinion.
PCT/US2020/055952, Apr. 28, 2021, International Preliminary Report on Patentability.
PCT/US2019/060028, Mar. 23, 2020, International Search Report and Written Opinion.
PCT/US2019/060028, May 20, 2021, International Preliminary Report on Patentability.
International Search Report and Written Opinion for International Application No. PCT/US2019/016242 dated Mar. 29, 2019.
International Search Report and Written Opinion for International Application No. PCT/US2016/066194 dated Apr. 7, 2017.
International Search Report and Written Opinion for International Application No. PCT/US2016/066188 dated Jul. 13, 2017.
Invitation to Pay Additional Fees for International Application No. PCT/US2019/016295 dated May 3, 2019.
International Search Report and Written Opinion for International Application No. PCT/US2019/016295 dated Jun. 26, 2019.
International Preliminary Report on Patentability for International Application No. PCT/US2019/016295 dated Aug. 13, 2020.
International Search Report and Written Opinion for International Application No. PCT/US2019/016276 dated Apr. 26, 2019.
International Search Report and Written Opinion for International Application No. PCT/US2019/029880 dated Aug. 8, 2019.
International Search Report and Written Opinion for International Application No. PCT/US2019/016317 dated Apr. 16, 2019.
International Search Report and Written Opinion for International Application No. PCT/US2020/059057 dated Feb. 8, 2021.
International Search Report and Written Opinion for International Application No. PCT/US2019/060030 dated May 20, 2021.
International Search Report and Written Opinion for International Application No. PCT/US2019/060698 dated May 20, 2021.
International Search Report and Written Opinion for International Application No. PCT/US2019/067084 dated Jul. 1, 2021.
International Search Report and Written Opinion for International Application No. PCT/US2019/013678 dated Jul. 29, 2021.
Invitation to Pay Additional Fees for International Application No. PCT/US2019/013678 dated Apr. 15, 2020.
International Search Report and Written Opinion for International Application No. PCT/US2021/020602 dated May 11, 2021.
International Search Report and Written Opinion for International Application No. PCT/US2020/055952 dated Jan. 28, 2021.
International Preliminary Report on Patentability for International Application No. PCT/US2019/060028 dated May 20, 2021.
International Search Report and Written Opinion for International Application No. PCT/US2019/060028 dated Mar. 23, 2020.
International Search Report and Written Opinion for International Application No. PCT/US2019/016272 dated Apr. 8, 2019.
International Preliminary Report on Patentability for International Application No. PCT/US2019/016272 dated Aug. 13, 2020.
International Preliminary Report on Patentability for International Application No. PCT/US2019/016276 dated Aug. 13, 2020.
International Preliminary Report on Patentability for International Application No. PCT/US2019/029880 dated Nov. 12, 2020.
International Preliminary Report on Patentability for International Application No. PCT/US2019/016317 dated Aug. 13, 2020.
International Preliminary Report on Patentability for International Application No. PCT/US2020/055952 dated Aug. 13, 2020.
[No Author Listed], Arm Limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium in Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., DOVER A Metadata-Extended RISC-V. Jan. 6, 2016:34. [https://web.archive.org/web/20160331131339 if /http://riscv.org/wp-content/uploads/2016/01/Wed1430-dover riscv jan2016 v3.pdf].
Dehon et al., DOVER: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.

(56) References Cited

OTHER PUBLICATIONS

Evans et al., Melding security metadata between software and hardware. Proceedings of the Posters and Demo Track Dec. 3, 2012:1-2.

Geater, Tee requirements for ISA. Thales eSecurity. 2018. 21 pages.

Hrițcu, Micro-policies: Formally verified, tag-based security monitors. Proceedings of the 10th ACM Workshop on Programming Languages and Analysis for Security Jul. 4, 2015.

Hunt et al., The Seven Properties of Highly Secure Devices. 2021. 10 pages.

Juglaret et al., Towards a fully abstract compiler using Micro-Policies: Secure compilation for mutually distrustful components. arXiv preprint arXiv:1510.00697. Oct. 2, 2015. 31 pages.

Kane, Runtime Monitoring for Safety-Critical Embedded Systems. Carnegie Mellon University. Feb. 2015;207 pages.

Kannan et al., Decoupling dynamic information flow tracking with a dedicated coprocessor. 2009 IEEE/IFIP International Conference on Dependable Systems & Networks. Jun. 29, 2009:105-14.

Mambretti et al., Trellis: Privilege separation for multi-user applications made easy. International Symposium on Research in Attacks, Intrusions, and Defenses. Springer, Cham. Sep. 19, 2016:437-56.

Nagarakatte et al., SoftBound: Highly Compatible and Complete Spatial Memory Safety for C. University of Pennsylvania Department of Computer and Information Science Technical Report. Jan. 2009. 12 pages.

Okhravi et al., One Giant Leap for Computer Security. IEEE Computer and Reliability Societies. Jul./Aug. 2020;18(4):8-19.

Ozsoy et al., SIFT: A low-overhead dynamic information flow tracking architecture for smt processors. Proceedings of the 8th ACM International Conference on Computing Frontiers. May 3, 2011:1-11.

Roessler et al., Protecting the stack with metadata policies and tagged hardware. 2018 IEEE Symposium on Security and Privacy (SP) May 20, 2018;478-95.

Song et al., Security tagging for a zero-kernel operating system. 2013 46th Hawaii International Conference on System Sciences Jan. 7, 2013:5049-58.

Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].

Suh et al., Secure Program Execution via Dynamic Information Flow Tracking. MIT CSAIL. Jul. 2003. 14 pages.

Sullivan et al., The dover inherently secure processor. 2017 IEEE International Symposium on Technologies for Homeland Security (HST) Apr. 25, 2017:1-5.

Tiwari et al., A small cache of large ranges: Hardware methods for efficiently searching, storing, and updating big dataflow tags. 2008 41st IEEE/ACM International Symposium on Microarchitecture Nov. 8, 2008:94-105.

Tiwari et al., Complete information flow tracking from the gates up. InProceedings of the 14th international conference on Architectural support for programming languages and operating systems Mar. 7, 2009;109-20.

Waterman et al., The RISC-V Instruction Set Manual, vol. I: Unprivileged ISA, Document Version Dec. 13, 2019. RISC-V Foundation. Dec. 2019. 238 pages.

Watson et al., Cheri: A hybrid capability-system architecture for scalable software compartmentalization. 2015 IEEE Symposium on Security and Privacy Sep. 2015;20-37.

Witchel et al., Mondrian Memory Protection. ASPLOS-X. 2002;13 pages.

Woodruff, Cheri: A RISC capability machine for practical memory safety. University of Cambridge, Computer Laboratory; 2014. 112 pages.

Zeldovich et al., Hardware Enforcement of Application Security Policies Using Tagged Memory. USENIX Symposium on Operating Systems Design and Implementation. Dec. 8, 2008:8;225-40.

U.S. Appl. No. 17/880,539, filed Aug. 3, 2022, Milburn et al.

U.S. Appl. No. 17/908,879, filed Sep. 1, 2022, Milburn et al.

International Preliminary Report on Patentability for International Application No. PCT/US2020/059057, dated May 19, 2022.

International Search Report and Written Opinion for International Application No. PCT/US2019/060030 dated Mar. 19, 2020.

International Search Report and Written Opinion for International Application No. PCT/US2019/060698 dated Feb. 3, 2020.

International Search Report and Written Opinion for International Application No. PCT/US2019/067084 dated Mar. 19, 2020.

International Search Report and Written Opinion for International Application No. PCT/US2019/013678 dated Jun. 23, 2020.

International Preliminary Report on Patentability for International Application No. PCT/US2021/020602, dated Sep. 15, 2022.

International Preliminary Report on Patentability for International Application No. PCT/US2020/055952 dated Apr. 28, 2022.

Mutlu, 18-447 Computer Architecture Lecture 11: Precise Exceptions, State Maintenance, State Recovery. Carnegie Mellon University Lecture. Feb. 11, 2015, 49 pages.

International Search Report and Written Opinion for International Application No. PCT/US2022/042492 dated Jan. 11, 2023.

PCT/US2022/042492, Jan. 11, 2023, International Search Report and Written Opinion.

* cited by examiner

SYSTEMS AND METHODS FOR CHECKING SAFETY PROPERTIES

RELATED APPLICATIONS

This application is a national stage filing under 35 U.S.C. § 371 of International Patent Application Serial No. PCT/US2019/029880, filed Apr. 30, 2019, which claims the benefit under 35 U.S.C. § 119(e) of U.S. Provisional Patent Application Ser. No. 62/664,554 filed on Apr. 30, 2018, titled "SYSTEMS AND METHODS FOR CHECKING SAFETY PROPERTIES," the contents of these applications are incorporated herein by reference in their entirety.

This application may include subject matter related to that of International Patent Application No. PCT/US2019/016272, filed on Feb. 1, 2019, titled "SYSTEMS AND METHODS FOR POLICY LINKING AND/OR LOADING FOR SECURE INITIALIZATION," which is hereby incorporated by reference in its entirety.

BACKGROUND

Safety critical systems are ever present in today's world, from high visibility systems like nuclear power plants and airliners, to more commonplace systems like anti-lock brakes and traffic lights. These systems are becoming more complex over time, adding functionalities as hardware processing capability grows. Designers struggle to ensure that critical safety properties remain intact in these increasingly complex systems.

Over the past 50 years, primary approaches to safety have been redundancy and careful development methodologies. A number of variations on redundancy exist, but all involve duplicating functionality to reduce failure probability. Redundant systems may be kept as backups awaiting a failure event, or may be processing in parallel with results decided by vote.

As for development methodologies, extensive verification and testing may be performed prior to deployment, to reduce coding errors that may lead to failures.

SUMMARY

In accordance with some embodiments, a system is provided, comprising enforcement hardware configured to execute, at run time, a state machine in parallel with application code. Executing the state machine may include: maintaining metadata that corresponds to one or more state variables of the state machine; matching instructions in the application code to transitions in the state machine; and, in response to determining that an instruction in the application code does not match any transition from a current state of the state machine, causing an error handling routine to be executed.

In accordance with some embodiments, a system is provided, comprising at least one processor and at least one non-transitory computer-readable medium having encoded thereon instructions which, when executed by the at least one processor, perform a method comprising translating a description of a state machine into at least one policy to be enforced at run time based on metadata labels associated with application code and/or data manipulated by the application code.

In accordance with some embodiments, a method is provided that is performed by any of the systems describe herein.

In accordance with some embodiments, at least one non-transitory computer-readable medium is provided, having encoded thereon instructions which, when executed by at least one processor, perform any of the methods described herein.

DETAILED DESCRIPTION

Figure 1:
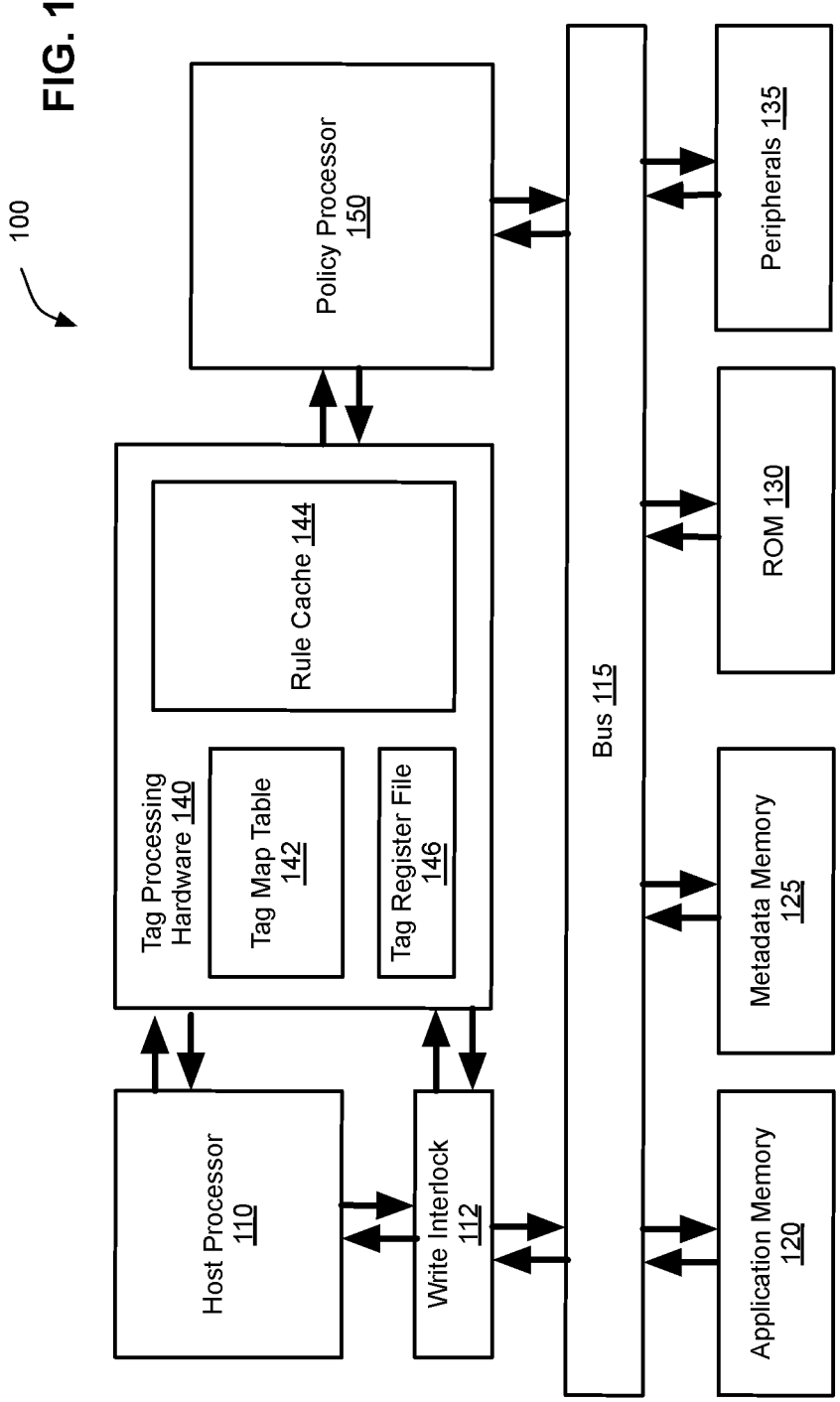
FIG. 1 shows an illustrative hardware system 100 for enforcing policies, in accordance with some embodiments.

Hardware redundancy has been a mainstay of safety engineering for dealing with probabilistic run time errors. Such errors may result from corruption of data that occur sporadically in hardware (e.g., due to exposure to cosmic rays), and may be mitigated by running multiple redundant systems in parallel and adopting a result returned by a plurality of the redundant systems.

The inventors have recognized and appreciated that redundancy may be expensive in both hardware cost and power consumption. Moreover, redundant systems commonly use multiple copies of a same software implementation executing on respective processor cores, so that an overall system may still be vulnerable to coding errors (colloquially referred to as "bugs") in the software implementation. While it is possible to independently develop different implementations of a software application, it may be prohibitively expensive to do so. Therefore, developers may rely on verification and testing to reduce coding errors, but such techniques may not be able to completely eliminate coding errors.

The inventors have further recognized and appreciated that approaches such as testing and redundancy were developed in an era prior to the advent of significant cybersecurity threats. As such, these approaches have focused on reducing software bugs and mitigating run time hardware glitches, as opposed to defending against deliberate malicious cyberattacks. Due to the prevalence of such attacks in today's environment, as well as complexity of modern software, it has become challenging to ensure correct functioning of safety critical systems at run time.

Accordingly, in some embodiments, a state machine may be provided that represents application behavior that is considered safe or otherwise desirable. Enforcement hardware may be provided to execute such a state machine in parallel with application code at run time. For instance, the enforcement hardware may, at run time, maintain metadata that corresponds to one or more state variables of the state machine. As the application code is executed, the enforcement hardware may match instructions in the application code to transitions in the state machine, and may perform metadata updates according to the matched transitions. If an instruction is attempted that does not match any allowed transition from a current state, the enforcement hardware may cause a suitable error handling routine to be executed, which may include generating an alert, preventing the instruction from being executed, etc.

In some embodiments, transitions in a state machine may be translated into rules of one or more policies. Enforcement hardware may be provided that includes policy enforcement hardware for enforcing the one or more policies. For instance, the policy enforcement hardware may continuously check run time behavior of an application against the one or more policies. If a policy violation is detected, which may indicate the application is deviating from intended safe or otherwise desirable behavior, the policy enforcement hardware may cause a suitable error handling routine to be executed, which may include generating an alert, halting the application, etc.

Traditional redundancy-based safety mechanisms (e.g., triple modular redundancy) replicate an entire functional unit including both software and hardware, and simply compare outputs from the replicas. By contrast, in some embodiments, enforcement hardware may be provided that is integrated with an application processor, and may check correctness as an application executes. In this manner, independent checking may be provided using only a small amount of additional hardware, without redundant processor cores. This may save power (e.g., by running one core instead of three), memory, and/or area on a System-on-Chip (SoC). Moreover, the enforcement hardware may be able to detect errors before such errors propagate to outputs.

In some embodiments, a general-purpose policy enforcement mechanism may be provided that is suitable for enforcing not only safety policies, but also privacy and/or security policies. For instance, the policy enforcement hardware may, at run time, maintain metadata for use in enforcing safety, privacy, and/or security policies. However, that is not required. In some embodiments, a safety-specific enforcement mechanism may be used in addition to, or instead of, a general-purpose policy enforcement mechanism.

Illustrative techniques for policy enforcement are described herein. For instance, in some embodiments, memory locations may be associated with metadata for use in enforcing one or more policies, and instructions may be checked for compliance with the one or more policies. Given an instruction to be executed, metadata associated with an opcode of the instruction and/or metadata associated with one or more operands of the instruction may be checked to determine if the instruction should be allowed. Additionally, or alternatively, appropriate metadata may be associated with an output of the instruction.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map address X in the application memory 120 to address Y in the metadata memory 125. Such an address Y is referred to herein as a "metadata tag" or simply a "tag." A value stored at the address Y is also referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing any further memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata symbol "RED" may be stored at the metadata memory address Z. By storing the metadata memory address Z in the metadata memory address Y, the application data stored at the application memory address X may be tagged "RED."

In this manner, the binary representation of the metadata symbol "RED" may be stored only once in the metadata memory 120. For instance, if application data stored at another application memory address X' is also to be tagged "RED," the tag map table 142 may map the application memory address X' to a metadata memory address Y' where the metadata memory address Z is also stored.

Moreover, in this manner, tag update may be simplified. For instance, if the application data stored at the application memory address X is to be tagged "BLUE" at a subsequent time, a metadata memory address Z' may be written at the metadata memory address Y, to replace the metadata memory address Z, and a binary representation of the metadata symbol "BLUE" may be stored at the metadata memory address Z'.

Thus, the inventors have recognized and appreciated that a chain of metadata memory addresses of any suitable length N may be used for tagging, including N=0 (e.g., where a binary representation of a metadata symbol is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructed read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding tag in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more input tags to a decision and/or one or more output tags. For instance, a query into the rule cache 144 may be similarly constructed as a query to the policy processor 150 to check if an instruction executed by the host processor 110 should be allowed. If there is a cache hit, the rule cache 144 may output a decision as to whether the instruction should be allowed, and/or one or more output tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss, the tag processing hardware 140 may query the policy processor 150, and may install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or data manipulated by the application code, notify an operator, etc.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
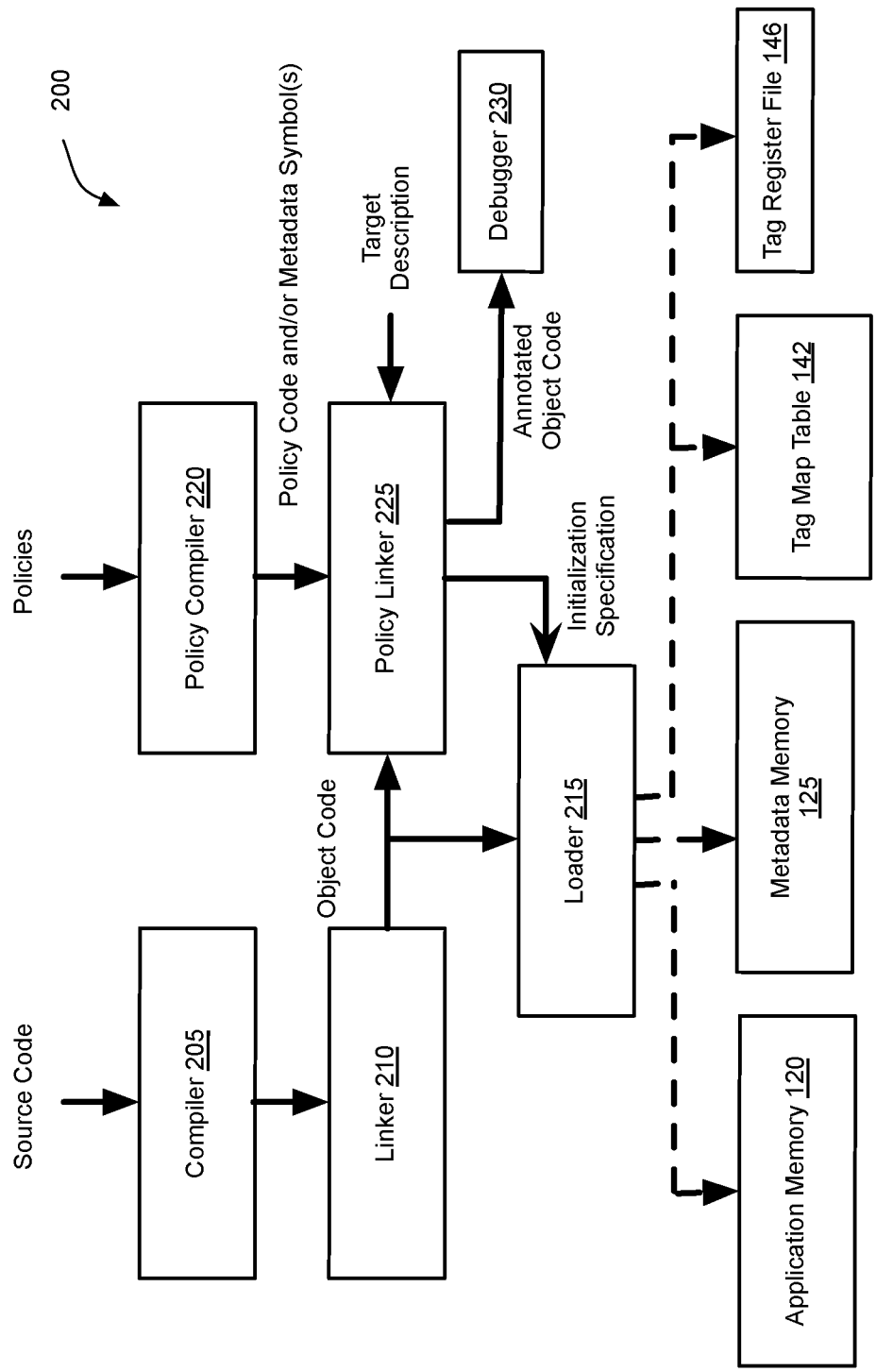
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate a policy written in a policy language into policy code. For instance, the policy compiler 220 may output policy code in C or some other suitable programming language. Additionally, or alternatively, the policy compiler 220 may output one or more metadata symbols referenced by the policy. At initialization, such a metadata symbol may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata symbols at load time. In some embodiments, one or more metadata symbols may be resolved statically (e.g., at compile time or link time). For example, the policy compiler 220 may process one or more applicable policies, and resolve one or more metadata symbols defined by the one or more policies into a statically-defined binary representation. Additionally, or alternatively, the policy linker 225 may resolve one or more metadata symbols into a statically-defined binary representation, or a pointer to a data structure storing a statically-defined binary representation. The inventors have recognized and appreciated that resolving metadata symbols statically may advantageously reduce load time processing. However, aspects of the present disclosure are not limited to resolving metadata symbols in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, with reference to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

Figure 6:
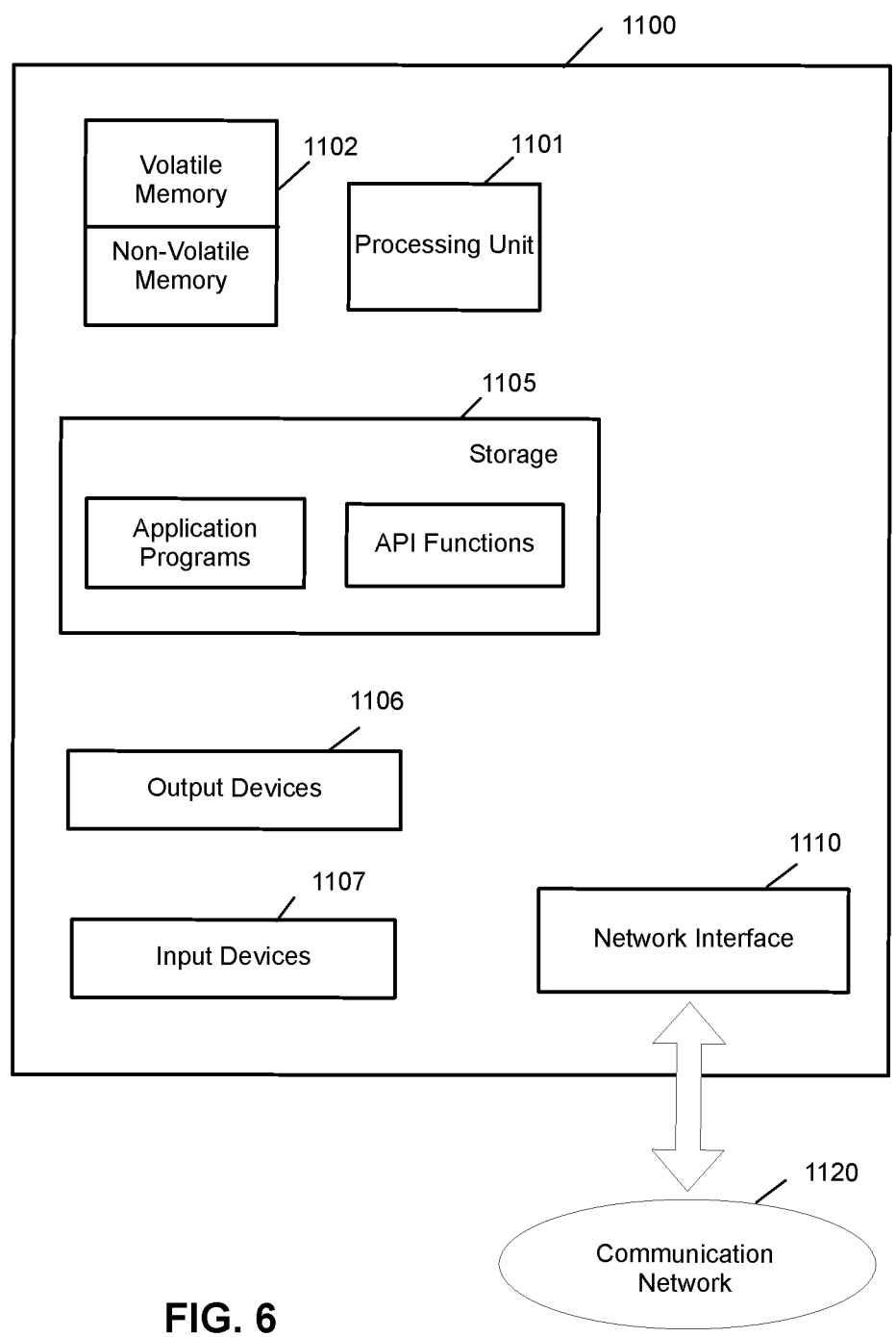
FIG. 6 shows, schematically, an illustrative computer 1100 on which any aspect of the present disclosure may be implemented.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. An example of such assembly code is shown in FIG. 6 and discussed below. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

With reference again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not "recognize" the metadata memory address Y even if the rule cache 144 already stores a mapping for the metadata memory address X. This may result in a large number of unnecessary rule cache misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that examples of details of implementation are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default symbols (e.g., "UNINITIALIZED") may be used for tagging at startup, and a policy processor (e.g., the illustrative policy processor 150 in the example of FIG. 1) may evaluate one or more policies and resolve the one or more default symbols in a just-in-time manner.

The inventors have recognized and appreciated that state machines provide a natural way to express desired behavior of a system. For instance, a safety property may be expressed based on a set of states that are designated as being safe, and/or a set of transitions that are designated as being allowed. An allowed transition may be such that, if a system starts in a safe state and takes the allowed transition, the system may end in a safe state (which may be the same as, or different from, the start state). In this manner, a formal proof may be given that the safety property will always be satisfied as long as the system is initialized to a safe state and only takes allowed transitions.

The inventors have further recognized and appreciated various advantages of using a state machine to model desired behavior of a system. For instance, a state machine that represents desired behavior may be simpler than full implementation code, and therefore may be easier to verify. In some embodiments, formal methods tools may be used to prove various properties of state machines.

Moreover, a state machine model may be developed independently from application software, and therefore may not be susceptible to coding errors that occur in the application software. When such a state machine is executed at run time alongside the application software, an attempt by the application software to execute an instruction that does not correspond to any allowed transition in the state machine may indicate a presence of a coding error. By contrast, redundancy-based safety mechanisms may be unable to detect coding errors. That is because a redundancy-based safety mechanism typically runs a same software implementation on multiple sets of hardware. As such, a coding error in the software implementation may be replicated on all replicas, which may return a same, albeit incorrect, answer.

Accordingly, illustrative techniques are described herein for using a state machine model to enforce one or more properties. Examples of properties that may be enforced in this manner include, but are not limited to, safety properties, spatial properties (e.g., information flow), and/or temporal properties (e.g., execution ordering).

In some embodiments, a hybrid approach may be used, where desired properties may be expressed as software-defined policies, and hardware logic may be provided to enforce the software-defined policies. The hardware logic may be integrated into an SoC. For instance, the hardware logic may include the illustrative write interlock 112, the illustrative tag processing hardware 140, and/or the illustrative policy processor 150 in the example of FIG. 1. Such hardware logic may monitor and/or control one or more host processors running applications for the SoC, such as the illustrative host processor 110 in the example of FIG. 1.

In some embodiments, policy enforcement hardware may check every instruction for compliance with one or more policies. If an instruction violates a policy, the policy enforcement hardware may cause an appropriate violation handling routine to be executed, which may include generating an alert, blocking the instruction from executing, etc.

In some embodiments, policy enforcement hardware may maintain strict separation between policy-related memory content and other memory content. For instance, policy enforcement software, policy code, and/or metadata manipulated by the policy enforcement hardware may reside in the illustrative metadata memory 125 in the example of FIG. 1, whereas application software and/or operating system being protected by the policy enforcement hardware may reside in the illustrative application memory 120 in the example of FIG. 1. The metadata memory 125 and the application memory 120 may be physically separate memories, or portions of a same memory that are separated using a suitable memory protection scheme. Additionally, or alternatively, separation may be effectuated using different modes of operation (e.g., user mode vs. privileged mode).

The inventors have recognized and appreciated that policy enforcement hardware that is integrated into an SoC may be able to check policy compliance at a low level, such as individual function calls and/or data updates. Such fine-grained checking may allow detection of errors internal to an application, before the errors propagate to outputs.

Moreover, because enforcement may be programmable via policies, multiple policies may be enforced at the same time. This ability to support multiple policies may allow simultaneous enforcement of privacy, security, and/or safety policies, which may prevent cyberattacks before such attacks lead to safety violations. For instance, policies may be written to address a wide range of security concerns, such as protecting memory against buffer overflows, preventing control flow hijacking (e.g., Return-Oriented Programming attacks), and/or managing information integrity and/or confidentiality.

In some embodiments, policies may be written to provide instruction-by-instruction assurances for a system. For instance, a policy may indicate metadata to be maintained about one or more words in a memory accessible to a host processor. Additionally, or alternatively, a policy may indicate metadata to be maintained that corresponds to one or more state variables of a state machine model. Additionally, or alternatively, a policy may include one or more rules that may be applied, based on relevant metadata, to determine whether an instruction should be allowed.

In some embodiments, policy rules may be written in a policy language, which may be designed to support analysis and verification. For instance, the policy language may include syntax designed to support description of finite state machines. Additionally, or alternatively, the policy language may include syntax designed to describe properties of interest for a certain application domain.

It should be appreciated that the techniques introduced above and discussed in greater detail below may be implemented in any of numerous ways, as the techniques are not limited to any particular manner of implementation.

In some embodiments, a finite state machine (FSM) may include one or more states and/or one or more transitions. A transition may have a source state and a target state. The source state and the target state may be the same state, or different states. Pictorially, an FSM may be represented as a directed graph in which nodes represent states and edges represent transitions between states.

Figure 3:
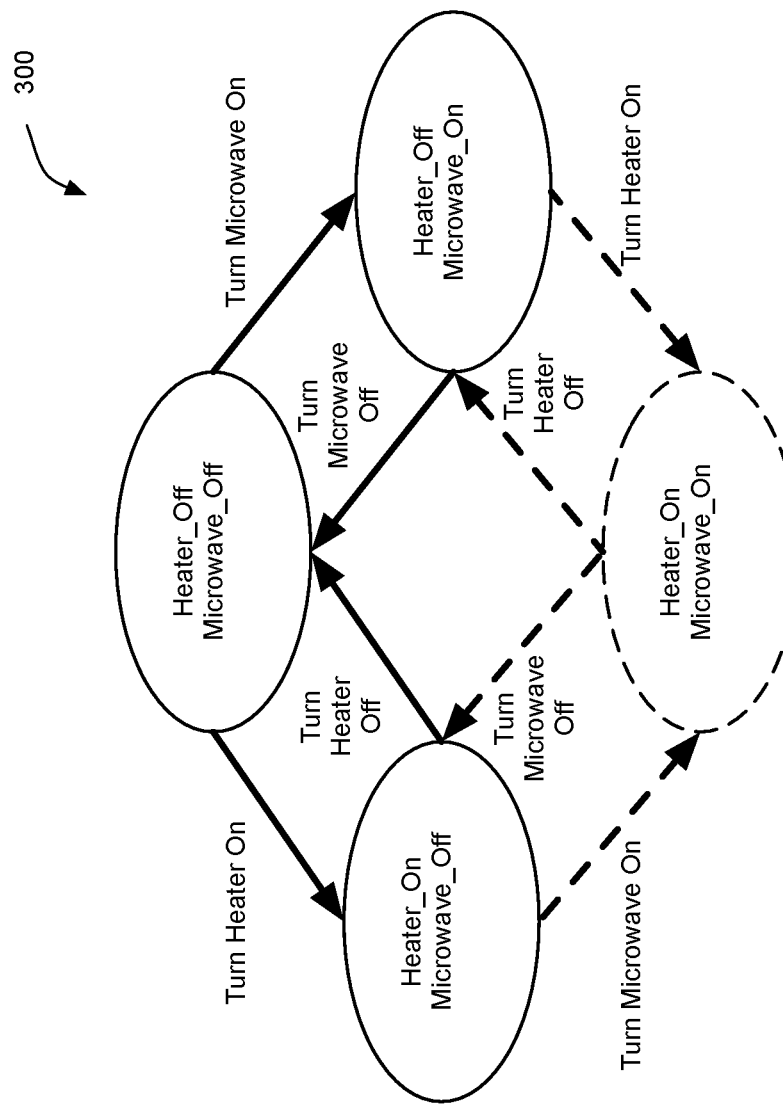
FIG. 3 shows an illustrative finite state machine (FSM) 300, in accordance with some embodiments.

In some embodiments, one or more safety properties to be monitored during application execution may be provided via a state machine description. FIG. 3 shows an illustrative FSM 300, in accordance with some embodiments. The FSM 300 may be described using one or more state variables. For instance, the FSM 300 may have two Boolean variables, Heater and Microwave, indicating, respectively, whether a space heater and a microwave oven are on or off. There may be eight transitions, each representing one of the two appliances being turned on or off.

In some embodiments, correct functioning of a system may be described using an FSM. For instance, in the example of FIG. 3, a state in which both the space heater and the microwave oven are on may be considered unsafe (e.g., a circuit breaker may trip because of excessive current). Thus, an FSM describing correct functioning of this system may only have three states: (1) both appliances are off, (2) only the space heater is on, and (3) only the microwave oven is on. These safe states are shown as solid ovals in FIG. 3, whereas the unsafe state (both appliances on) is shown as a dashed oval.

In some embodiments, the FSM describing correct functioning of the above system may only have transitions that would keep the system in a safe state. For instance, a transition representing the space heater being turned on from a state in which the microwave oven is already on, and vice versa, may not be in this FSM, because such a transition would have taken the system to the unsafe state, in which both appliances are on. Such disallowed transitions are shown as dashed arrows in FIG. 3, whereas allowed transitions are shown as solid arrows. Transitions leaving the unsafe state are also shown as dashed arrows, because such transitions would never be taken if the system never enters the unsafe state.

In some embodiments, an FSM specification of correct behavior may be translated into a policy to be enforced at run time by policy enforcement hardware. For instance, each possible value of each state variable of the FSM may be assigned a metadata symbol (e.g., Heater_On, Heater_Off, Microwave_On, and Microwave_Off), and a transition of the FSM may be translated into one or more policy rules. At run time, relevant aspects of the software may be labeled with these metadata symbols, and the policy rules may be checked by the policy enforcement hardware.

Figure 4:
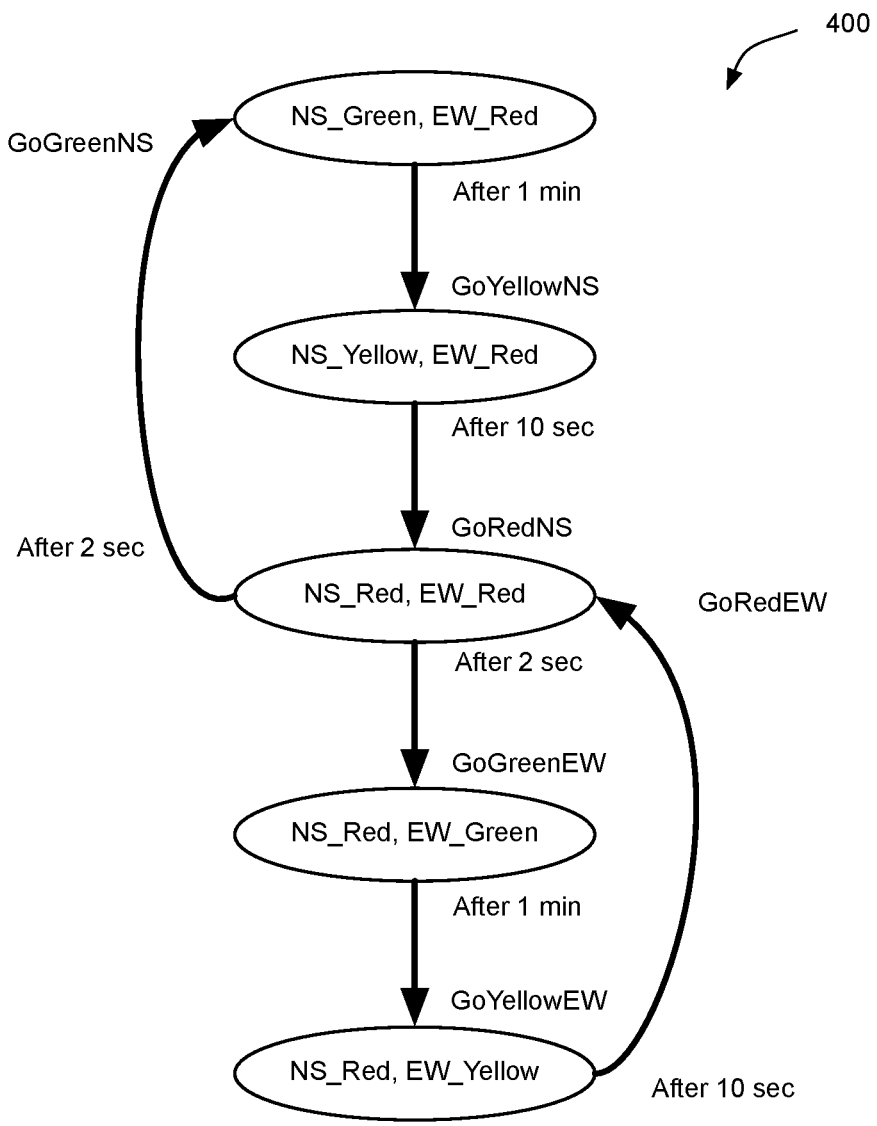
FIG. 4 shows an illustrative FSM 400, in accordance with some embodiments.

FIG. 4 shows an illustrative FSM 400, in accordance with some embodiments. For instance, the FSM 400 may represent a safety policy for a traffic light controller at a four-way intersection, where a light facing north and a light facing south may always show a same color, and likewise for a light facing east and a light facing west. The safety policy may indicate that if the north-south lights are not red (e.g., green or yellow), then the east-west lights must be red, and vice versa. Thus, the north-south lights and the east-west lights may never be all green simultaneously.

In the example of FIG. 4, the FSM 400 has two state variables: color of the north-south lights and color of the east-west lights. Each state variable may have three possible values: red, yellow, and green. The green-yellow, yellow-green, yellow-yellow and green-green states do not appear in the FSM 400 because such states are considered to be safety violations in this example. Thus, there may be only five safe states.

In some embodiments, the FSM 400 may have transitions that each represent a set of lights turning a selected color. For instance, after the FSM 400 has been in the green-red state for one minute, a transition may take place, representing the north-south lights turning from green to yellow, while the east-west lights remain red. This may cause the FSM 400 to enter in the yellow-red state.

In some embodiments, the FSM 400 may be translated into a policy. For example, the policy may include metadata symbols that correspond to values of state variables of the FSM 400. At run time, one or more of these metadata symbols may be written to a memory location accessible to policy enforcement hardware (e.g., a location in the illustrative metadata memory 125 in the example of FIG. 1). For instance, one or more of these metadata symbols may be written to a memory location allocated for a metadata variable (e.g., an environment variable) maintained by the policy enforcement hardware for policy checking purposes. Examples of state metadata symbols for the FSM 400 may include the following.

```
metadata:
    NS_Red
    NS_Yellow
    NS_Green
    EW_Red
    EW_Yellow
    EW_Green
```

In this example, each value of each state variable is assigned a metadata symbol. Thus, a state of the FSM 400 may be represented as a pair of symbols, such as [NS_Red, EW_Green]. However, that is not required. In some embodiments, individual symbols may be used for combined colors, such as NS_Red_&_EW_Green.

Additionally, or alternatively, the policy may include metadata symbols that correspond to transitions in the FSM 400. At run time, one or more of these metadata symbols may be used to label application code executed by the traffic light controller. For instance, one or more of these metadata symbols may be written to a first memory location accessible to policy enforcement hardware (e.g., a location in the illustrative metadata memory 125 in the example of FIG. 1). The first memory location may be associated (e.g., via the illustrative tag map table 142 in the example of FIG. 1) with a second memory location (e.g., a location in the illustrative application memory 120 in the example of FIG. 1). The application code to be labeled by the one or more metadata symbols may be stored at the second memory location. Examples of transition metadata symbols for the FSM 400 may include the following.

```
metadata:
    GoGreenNS
    GoGreenEW
    GoRedNS
    GoRedEW
    GoYellowNS
    GoYellowEW
```

In some embodiments, transitions in the FSM 100 may be translated into policy rules, such as one or more of the following policy rules.

```
policy:
    codeOnlyLightPol =
        allGrp(code == [+GoGreenNS],    env == [NS_Red, EW_Red]      -> env = {NS_Green, EW_Red})
      ^ allGrp(code == [+GoGreenEW],    env == [NS_Red, EW_Red]      -> env = {NS_Red, EW_Green})
      ^ allGrp(code == [+GoYellowNS]   , env == [NS_Green, EW_Red]   -> env = {NS_Yellow, EW_Red})
      ^ allGrp(code == [+GoYellowEW]   , env == [NS_Red, EW_Green]   -> env = {NS_Red, EW_Yellow})
      ^ allGrp(code == [+GoRedNS]      , env == [NS_Yellow, EW_Red]  -> env = {NS_Red, EW_Red})
      ^ allGrp(code == [+GoRedEW]      , env == [NS_Red, EW_Yellow]  -> env = {NS_Red, EW_Red})
      ^ allGrp(code == [-GoGreenNS, -GoGreenEW, -GoYellowNS, -GoYellowEW, -GoRedNS, -GoRedEW], env == _ -> env= env)
```

In this example, a policy rule may start with allGrp, which may indicate that any instruction type may be eligible to trigger the rule.

In some embodiments, the "code== . . . " portion of the rule may indicate one or more transition metadata labels (e.g., "GoGreenNS"). At run time, policy enforcement hardware may check if a metadata label associated with an instruction to be executed by a host processor (e.g., the illustrative host processor 110) matches the one or more transition metadata labels indicated in the "code== . . . " portion of the rule.

In some embodiments, the first "env== . . . " portion of the rule (before the right arrow) may indicate one or more state metadata labels (e.g., "NS_Red, EW_Red"). At run time, the policy enforcement hardware may check if a content of a metadata variable (e.g., an environment variable) maintained by the policy enforcement hardware matches the one or more state metadata labels indicated in the first "env== . . . " portion of the rule.

In some embodiments, if the metadata label associated with the instruction to be executed matches the one or more transition metadata labels indicated in the "code== . . . " portion of the rule, and the content of the metadata variable maintained by the policy enforcement hardware matches the one or more state metadata labels indicated in the first "env== . . . " portion of the rule, then the policy enforcement hardware may allow execution of the instruction.

In some embodiments, the second "env== . . . " portion of the rule (after the right arrow) may indicate one or more state metadata labels (e.g., "NS_Green, EW_Red"). At run time, if the policy enforcement hardware determines that the instruction should be allowed, the policy enforcement hardware may update the content of the metadata variable maintained by the policy enforcement hardware with the one or more state metadata labels indicated in the second "env== . . . " portion of the rule. In this manner, the metadata variable may be used by the policy enforcement hardware to keep track of state of the FSM 400 while the policy enforcement hardware executes the FSM 400 at run time, alongside the application code of the traffic light controller.

depicted as an arrow looping back to the same state, implicit in the illustrative FSM 400 shown in FIG. 4.

The following table shows an example of traffic light states over a period of time.

| Without Policy Enforcement Hardware North-West:East-West main:create streets task start scheduler | With Policy Enforcement Hardware North-West:East-West main:create streets task start scheduler |
|---|---|
| green:red | green:red |
| green:red | green:red |
| green:red | green:red |
| green:red | green:red |
| yellow:red | yellow:red |
| yellow:red | yellow:red |
| red:red | red:red |
| red:green | red:green |
| red:green | red:green |
| red:green | red:green |
| red:green | red:green |
| red:yellow | red:yellow |
| red:yellow | red:yellow |
| red:red | red:red |
| green:red | green:red |
| green:red | green:red |
| green:red | green:red |
| green:green[[attack]] | red:red [[attack]] |
| yellow:green | red:green |
| yellow:green | red:green |
| red:green | red:green |
| red:yellow | red:green |
| red:yellow | red:yellow |
| red:red | red:yellow |

The rules in the above example may be described as follows.
1. The first rule may represent the north-south lights turning green from a state in which all lights are red, resulting in a state in which the north-south lights are green, and the east-west lights are red.
2. The second rule may represent the east-west lights turning green from the state in which all lights are red, resulting in a state in which the north-south lights are red, and the east-west lights are green.
3. The third rule may represent the north-south lights turning yellow from the state in which the north-south lights are green, and the east-west lights are red, resulting in a state in which the north-south lights are yellow, and the east-west lights are red.
4. The fourth rule may represent the east-west lights turning yellow from the state in which the north-south lights are red, and the east-west lights are green, resulting in a state in which the north-south lights are red, and the east-west lights are yellow.
5. The fifth rule may represent the north-south lights turning red from the state in which the north-south lights are yellow, and the east-west lights are red, resulting in the state in which all lights are red.
6. The sixth rule may represent the east-west lights turning red from the state in which the north-south lights are red, and the east-west lights are yellow, resulting in the state in which all lights are red.
7. The seventh rule may indicate that all instructions not labeled with any of the transition metadata labels (i.e., GoGreenNS, GoGreenEW, GoYellowNS, GoYellowEW, GoRedNS, and GoRedEW) may be allowed to execute, and may not cause any state change. This may correspond to a self-transition at each state, usually In the above example, the left column shows a succession of states for a traffic light that is not protected with policy enforcement hardware enforcing a safety policy. When such a system is attacked, it may be able to transition to an unsafe state (e.g., green-green). For instance, an attacker may cause the east-west lights to turn from red to green, while the north-south lights are still green. The right column shows a traffic light that is protected with policy enforcement hardware enforcing a safety policy. When such a system is attacked, an instruction (e.g., malicious code injected by an attacker) attempting to cause the east-west lights to turn from red to green, while the north-south lights are still green, may be blocked by the policy enforcement hardware, because no rule exists that allows a transition from [NS_Green, EW_Red] to [NS_Green, EW_Green]. In some embodiments, the policy enforcement hardware may cause a violation handler to be executed, which may in turn cause both the north-south lights and the east-west lights to reset to red.

Although not shown above, the policy enforcement hardware may, in some embodiments, block an instruction attempting to cause the east-west lights to turn from red to yellow, because no rule exists that allows a transition from EW_Red to EW_Yellow (regardless of color of the north-south lights).

In some embodiments, the illustrative codeOnlyLightPol policy may include one or more rules corresponding to disallowed transitions of the FSM 400, in addition to, or instead of, one or more rules corresponding to allowed transitions of the FSM 400. For instance, one or more of the following rules may be included, in addition to, or instead of, any of the seven illustrative rules above.

```
^ allGrp(code == [+GoGreenNS], env == [_, EW_Green]   -> fail "Safety
Violation - East-West Lights Still Green")
  ^ allGrp(code == [+GoGreenNS], env == [_, EW_Yellow]  -> fail "Safety
Violation - East-West Lights Still Yellow")
  ^ allGrp(code == [+GoYellowNS], env == [_, EW_Green]  -> fail "Safety
Violation - East-West Lights Still Green")
  ^ allGrp(code == [+GoYellowNS], env == [_, EW_Yellow] -> fail "Safety
Violation - East-West Lights Still Yellow")
  ^ allGrp(code == [+GoGreenEW], env == [NS_Green, _]   -> fail "Safety
Violation - North-South Lights Still Green")
  ^ allGrp(code == [+GoGreenEW], env == [NS_Yellow, _]  -> fail "Safety
Violation - North-South Lights Still Yellow")
  ^ allGrp(code == [+GoYellowEW], env == [NS_Green, _]  -> fail "Safety
Violation - North-South Lights Still Green")
  ^ allGrp(code == [+GoYellowEW], env == [NS_Yellow, _] -> fail "Safety
Violation - North-South Lights Still Yellow")
  ^ allGrp(code == _         , env == [NS_Yellow, EW_Green] -> fail
"Safety Violation - Neither Set of Lights Is Red")
  ^ allGrp(code == _         , env == [NS_Green, EW_Yellow] -> fail
"Safety Violation - Neither Set of Lights Is Red")
  ^ allGrp(code == _         , env == [NS_Green, EW_Green] -> fail "Safety
Violation - Neither Set of Lights Is Red")
```

The additional rules may be described as follows.
8. The eighth rule may indicate that the north-south lights turning green from any state in which the east-west lights are green is a violation of the safety policy.
9. The ninth rule may indicate that the north-south lights turning green from any state in which the east-west lights are yellow is a violation of the safety policy.
10. The tenth rule may indicate that the north-south lights turning yellow from any state in which the east-west lights are green is a violation of the safety policy.
11. The eleventh rule may indicate that the north-south lights turning yellow from any state in which the east-west lights are yellow is a violation of the safety policy.
12. The twelfth rule may indicate that the east-west lights turning green from any state in which the north-south lights are green is a violation of the safety policy.
13. The thirteenth rule may indicate that the east-west lights turning green from any state in which the north-south lights are yellow is a violation of the safety policy.
14. The fourteenth rule may indicate that the east-west lights turning yellow from any state in which the north-south lights are green is a violation of the safety policy.
15. The fifteenth rule may indicate that the east-west lights turning yellow from any state in which the north-south lights are yellow is a violation of the safety policy.
16. The sixteenth rule may indicate that all instructions executing at a time when the north-south lights are yellow, and the east-west lights are green, is a violation of the safety policy.
17. The seventeenth rule may indicate that all instructions executing at a time when the north-south lights are green, and the east-west lights are yellow, is a violation of the safety policy.
18. The eighteenth rule may indicate that all instructions executing at a time when both the north-south lights and the east-west lights are green is a violation of the safety policy.

In the above example, the underscore character may indicate a wildcard. For instance, the expression, code==_, in a rule may indicate that the rule may be triggered regardless of what metadata label is associated with an instruction to be executed.

The inventors have recognized and appreciated that, in some instances, it may be advantageous to explicitly model a disallowed transition in an FSM via a rule in a policy. For instance, the policy enforcement hardware may issue an appropriate error message (e.g., "East-West Lights Still Green") when a rule corresponding to a disallowed transition is matched. In some embodiments, such an error message may be consumed by a debugging tool (e.g., the illustrative debugger 230 in the example of FIG. 2).

Illustrative application code for a traffic light controller is provided below. In this example, there are two street variables, "ns_street" and "ew_street," that each hold a current color of lights for a corresponding street. A set of functions may be provided to change colors of the lights by modifying the two street variables.

color_t ns_street;
color_t ew_street;
void go_green_NS(void){
    street_t street=&ns_street;
    vTimerSetTimerID(timer, street);

```
color_t ns_street;
color_t ew_street;
void go_green_NS( void ){
    street_t street = &ns_street;
    vTimerSetTimerID(timer, street);
    *street = green;
}
void go_green_EW( void ){
    street_t street = &ew_street;
    vTimerSetTimerID(timer, street);
    *street = green;
}
void go_yellow_NS( void ){
    street_t street = &ns_street;
    vTimerSetTimerID(timer, street);
    *street = yellow;
}
void go_yellow_EW( void ){
    street_t street = &ew_street;
    vTimerSetTimerID(timer, street);
    *street = yellow;
}
void go_red_NS( void ){
    street_t street = &ns_street;
    vTimerSetTimerID(timer, street);
    *street = red;
}
void go_red_EW( void ){
```

```
            street_t street = &ew_street;
            vTimerSetTimerID(timer, street);
            *street = red;
       }
```

In some embodiments, the safety policy model described above in connection with FIG. 4 may be used to protect the above traffic light controller. Accordingly, a state of the safety policy model may be maintained by policy enforcement hardware in an environment metadata variable, which may be stored in a metadata memory (e.g., in the illustrative metadata memory 125 in the example of FIG. 1). By contrast, application state may be represented by the two street variables (i.e., ns_street and ew_street), which may be stored in an application memory (e.g., the illustrative application memory 120 in the example of FIG. 1).

In some embodiments, the policy enforcement hardware may label each of the go_ . . . functions (e.g., go_green_NS) with a corresponding Go . . . metadata symbol (e.g., GoGreenNS). For instance, the first instruction of each of the go_ . . . functions may be labeled with a corresponding Go . . . metadata symbol. In this manner, when each of the go_ . . . functions (e.g., go_green_NS) is executed, the metadata on the first instruction (e.g., GoGreenNS) may match a "code== . . . " portion (e.g., "code==[+GoGreenNS]") of one or more rules (e.g., the first, seventh, and/or eighth rules) in the above example.

In some embodiments, if an attacker tries to call a function (e.g., go_green_EW) maliciously to cause a disallowed transition to an unsafe state (e.g., from the green-red state to the green-green state), the first instruction of the function may fail to match any rule of the safety policy model, which may trigger a violation. In some embodiments, the first instruction may match a rule that explicitly calls out a violation (e.g. the twelfth rule in the above example). In this manner, the function may be executed only when it is safe to do so.

In some embodiments, if a function call (e.g., go_green_NS) matches a rule in the safety policy model (e.g., the first rule in the above example), the policy enforcement hardware may update a state of the safety policy model according to the matched rule (e.g., updating the environment metadata variable to [NS_Green, EW_Red]).

The inventors have recognized and appreciated that it may be desirable to protect information flow from the go_ . . . functions to the two street variables (i.e., ns_street and ew_street) in the above illustrative application code. Such protection may be provided, in addition to, or instead of, executing the safety policy model alongside the application code.

For instance, the inventors have recognized and appreciated an attacker may be able to cause a transition into an unsafe state by modifying a street variable in an evasive manner, so that the policy enforcement hardware may not become aware of the transition. This may occur, for example, if the go_red_NS function saves a value of the local street variable, street, to a call stack (e.g., a C run time stack) in preparation for a function call (e.g., a call to vTimerSetTimerID). This saved value may be a first pointer pointing to a memory location of the global variable, ns_street. In some instances, an attacker may be able to cause execution of compromised code during the function call. The compromised code may use the first pointer to turn the north-south lights to green. Additionally, or alternatively, the compromised code may modify the call stack to replace the first pointer with a second pointer (e.g., a pointer pointing to an unused memory location). When execution returns to go_red_NS from the function call, the last line (i.e., *street=red) may write the value red to a memory location referenced by the second pointer (e.g., the unused memory location), instead of the first pointer. This may effectively nullify an intended update of the global variable, ns_street.

The inventors have recognized and appreciated that the above example involves a violation of information flow integrity. Accordingly, improved security may be provided by applying a safety policy in conjunction with a policy for maintaining information flow integrity, such as a policy that protects against unauthorized updates to the global variables ns_street and ew_street. For instance, techniques may be provided for associating metadata with the global variables ns_street and ew_street, and for performing access control based on the metadata.

In some embodiments, a policy may be provided for maintaining both safety and information flow integrity. For instance, a policy may be provided that, when enforced, cause policy enforcement hardware to directly link one or more state variables of a state machine model with one or more variables in application code (e.g., by associating one or more state metadata labels of a safety policy with values of the global variables ns_street and ew_street in the above illustrative application code). An example of such a hybrid policy is provided below.

```
policy:
    codePlusDataLightPol =
           storeGrp(code == [+GoGreenNS],    env == [-EW], mem == [NS, Red]   -> env =
    {NS}, mem = {NS, Green})
         ^ storeGrp(code == [+GoGreenEW],    env == [-NS], mem == [EW, Red]   -> env =
    {EW}, mem = {EW, Green})
         ^ storeGrp(code == [+GoYellowNS]          , env == [-EW], mem == [NS, Green]   -> env
    = env, mem = {NS, Yellow})
         ^ storeGrp(code == [+GoYellowEW]          , env == [-NS], mem == [EW, Green]   -> env
    = env, mem = {EW, Yellow})
         ^ storeGrp(code == [+GoRedNS]             , env == [-EW], mem == [NS, Yellow]  -> env
    = { }, mem = {NS, Red})
         ^ storeGrp(code == [+GoRedEW]             , env == [-NS], mem == [EW, Yellow]  -> env
    = { }, mem = {EW, Red})
         ^ storeGrp(code == [+InitRedNS]     , env == _  , mem == _      -> env =
    { }, mem = {NS, Red})
         ^ storeGrp(code == [+InitRedEW]     , env == _  , mem == _      -> env =
    { }, mem = {EW, Red})
         ^ storeGrp(code == _                , env == _     , mem == [NS]    -> fail
    "Safety violation")
```

```
    ˆ storeGrp(code == _              , env == _     , mem == [EW]    -> fail
"Safety violation")
    ˆ allGrp(code == _                , env == _     -> env = env)
```

In this example, the codePlusDataLightPol policy has state metadata symbols NS, EW, Red, Green, and Yellow. When the north-south lights are green or yellow, the policy enforcement hardware may store a metadata label comprising the symbol NS in an environment metadata variable (env). Likewise, when the east-west lights are green or yellow, the policy enforcement hardware may store a metadata label comprising the symbol EW in the environment metadata variable (env).

In some embodiments, the policy enforcement hardware may associate a metadata label comprising the symbol NS with a memory location of the global variable ns_street. Additionally, or alternatively, the metadata label may comprise a color symbol (e.g., Red, Green, or Yellow) corresponding to a current value of the global variable ns_street. Likewise, the policy enforcement hardware may associate a metadata label comprising the symbol EW with a memory location of the global variable ew_street. Additionally, or alternatively, the metadata label may comprise a color symbol (e.g., Red, Green, or Yellow) corresponding to a current value of the global variable ew_street.

In some embodiments, the codePlusDataLightPol policy may have transition metadata symbols InitRedNS and InitRedEW, in addition to, or instead of, the illustrative transition metadata symbols GoGreenNS, GoGreenEW, GoYellowNS, GoYellowEW, GoRedNS, and GoRedEW described above. For instance, the policy enforcement hardware may associate a metadata label comprising the symbol InitRedNS with the first instruction of a function that initializes the global variable ns_street to Red. Likewise, the policy enforcement hardware may associate a metadata label comprising the symbol InitRedNS with the first instruction of a function that initializes the global variable ns_street to Red. In some embodiments, only these initialization functions, as well as the go_ . . . functions in the above illustrative application code, may be allowed to modify the global variables ns_street and ew_street.

The rules in the illustrative codePlusDataLightPol policy may be described as follows. The first ten rules may start with storeGrp, which may indicate that only store instructions may be eligible to trigger those rules.

1. The first rule may represent the north-south lights turning green from a state in which all lights are red, resulting in a state in which the north-south lights are green, and the east-west lights are red. The expression, env==[-EW], may indicate that the cast-west lights are red (i.e., not green or yellow). The expression, mem==[NS, Red], may indicate that a store instruction is attempting to modify the global variable ns_street, and that the north-south lights are red. If the first rule is matched, the store instruction may be allowed under codePlusDataLightPol. In some embodiments, the environment metadata variable may be updated to indicate the north-south lights are no longer red: env={NS}. Additionally, or alternatively, the metadata label associated with the global variable ns_street may be updated to indicate the north-south lights are now green: mem={NS, Green}.
2. The second rule may represent the east-west lights turning green from a state in which all lights are red, resulting in a state in which the east-west lights are green, and the north-south lights are red. The expression, env==[-NS], may indicate that the north-south lights are red (i.e., not green or yellow). The expression, mem==[EW, Red], may indicate that a store instruction is attempting to modify the global variable ew_street, and that the east-west lights are red. If the second rule is matched, the store instruction may be allowed under codePlusDataLightPol. In some embodiments, the environment metadata variable may be updated to indicate the east-west lights are no longer red: env={EW}. Additionally, or alternatively, the metadata label associated with the global variable ew_street may be updated to indicate the east-west lights are now green: mem={EW, Green}.
3. The third rule may represent the north-south lights turning yellow from a state in which the north-south lights are green, and the east-west lights are red, resulting in a state in which the north-south lights are yellow, and the east-west lights are red. The expression, env==[-EW], may indicate that the east-west lights are red (i.e., not green or yellow). The expression, mem==[NS, Green], may indicate that a store instruction is attempting to modify the global variable ns_street, and that the north-south lights are green. If the third rule is matched, the store instruction may be allowed under codePlusDataLightPol. In some embodiments, the metadata label associated with the global variable ns_street may be updated to indicate the north-south lights are now yellow: mem={NS, Yellow}.
4. The fourth rule may represent the east-west lights turning yellow from a state in which the cast-west lights are green, and the north-south lights are red, resulting in a state in which the north-south lights are red, and the east-west lights are yellow. The expression, env==[-NS], may indicate that the north-south lights are red (i.e., not green or yellow). The expression, mem==[EW, Green], may indicate that a store instruction is attempting to modify the global variable ew_street, and that the east-west lights are green. If the fourth rule is matched, the store instruction may be allowed under codePlusDataLightPol. In some embodiments, the metadata label associated with the global variable ew_street may be updated to indicate the east-west lights are now yellow: mem={EW, Yellow}.
5. The fifth rule may represent the north-south lights turning red from a state in which the north-south lights are yellow, and the cast-west lights are red, resulting in a state in which all lights are red. The expression, env==[-EW], may indicate that the east-west lights are red (i.e., not green or yellow). The expression, mem==[NS, Yellow], may indicate that a store instruction is attempting to modify the global variable ns_street, and that the north-south lights are yellow. If the fifth rule is matched, the store instruction may be allowed under codePlusDataLightPol. In some embodiments, the metadata label associated with the global variable ns_street may be updated to indicate the north-south lights are now red: mem={NS, Red}.

6. The sixth rule may represent the east-west lights turning red from a state in which the east-west lights are yellow, and the north-south lights are red, resulting in a state in which all lights are red. The expression, env==[-NS], may indicate that the north-south lights are red (i.e., not green or yellow). The expression, mem==[EW, Yellow], may indicate that a store instruction is attempting to modify the global variable ew_street, and that the east-west lights are yellow. If the sixth rule is matched, the store instruction may be allowed under codePlusDataLightPol. In some embodiments, the metadata label associated with the global variable ew_street may be updated to indicate the east-west lights are now red: mem={EW, Red}.

7. The seventh rule may represent the north-south lights being initialized to red. If the seventh rule is matched, a store instruction of this initialization function may be allowed under codePlusDataLightPol. In some embodiments, the metadata label associated with the global variable ns_street may be updated to indicate the north-south lights are now red: mem={NS, Red}. The environment variable may be cleared: env={ }. In some embodiments, both the north-south lights and the east-west lights may be initialized to red. See eighth rule below.

8. The eighth rule may represent the east-west lights being initialized to red. If the eighth rule is matched, a store instruction of this initialization function may be allowed. In some embodiments, the metadata label associated with the global variable ew_street may be updated to indicate the east-west lights are now red: mem={EW, Red}. The environment variable may be cleared: env={ }. In some embodiments, both the north-south lights and the east-west lights may be initialized to red. See seventh rule above.

9. The ninth rule may indicate that, if a store instruction is attempting to modify the global variable ns_street, but the store instruction does not match any of the first eight rules, then the store instruction may represent a safety policy violation.

10. The tenth rule may indicate that, if a store instruction is attempting to modify the global variable ew_street, but the store instruction does not match any of the first eight rules, then the store instruction may represent a safety policy violation.

11. The eleventh rule may indicate that any instruction that does not match the first ten rules may be allowed.

The inventors have recognized and appreciated that having rules triggered by store instructions may help to maintain correct information flow from the go_ . . . functions to the global variables ns_street and ew_street. Accordingly, in some embodiments, the policy enforcement hardware may label an entire body of a go_ . . . function (e.g., go_green_NS) in the above illustrative application code with a corresponding Go . . . metadata symbol (e.g., GoGreenNS). In this manner, all store instructions inside the go_ . . . function may be labeled. When such a store instruction is executed, an appropriate rule in the illustrative codePlusDataLightPol policy may be triggered (e.g., the first rule).

If compromised code attempts to modify one of the global variables ns_street and ew_street via a store instruction, that store instruction may not be labeled with any Go . . . metadata symbol, and therefore may not match any of the first six rules of the illustrative codePlusDataLightPol policy. Instead, the store instruction of the compromised code may match the seventh or eighth rule, which may trigger a safety violation. Thus, a vulnerable information flow path may be eliminated by triggering FSM transitions at store instructions, as opposed to at entry points of the go_ . . . functions as done in the illustrative codeOnlyLightPol policy.

It should be appreciated that aspects of the present disclosure are not limited to labeling instructions in any particular manner, or at all. In some embodiments, the first instruction of a go_ . . . function (e.g., go_green_NS) in the above illustrative application code may be labeled with a Go . . . metadata symbol (e.g., GoGreenNSEntry) that indicates the instruction is an allowed entry point for the go_ . . . function. Additionally, or alternatively, the last instruction of the go_ . . . function (e.g., go_green_NS) in the above illustrative application code may be labeled with a Go . . . metadata symbol (e.g., GoGreenNSExit) that indicates the instruction is an allowed exit point for the go_ . . . function. Additionally, or alternatively, one or more other instructions of the go . . . function (e.g., go_green_Ns) in the above illustrative application code may be labeled with a Go . . . metadata symbol (e.g., GoGreenNSInterior) that indicates the one or more instructions are inside the go_ . . . function.

In some embodiments, a rule may be provided that allows the first instruction of a go_ . . . function to execute, and updates an environment metadata variable to indicate entry into the go_ . . . function. An example of such a rule is provided below.

```
allGrp (code == [+GoGreenNSEntry],
env == [NS_Red, EW_Red] -> env =
{NS_Red, EW_Red, InsideGoGreenNS})
```

In some embodiments, a rule may be provided that allows the last instruction of the go_ . . . function to execute, and updates the environment metadata variable to indicate exit out of the go_ . . . function and a new color of a corresponding set of lights. An example of such a rule is provided below.

```
allGrp (code == [+GoGreenNSExit],
env == [NS_Red, EW_Red, InsideGoGreenNS] ->
env = {NS_Green, EW_Red})
```

In some embodiments, a rule may be provided that allows an interior instruction of a go_ . . . function to execute. An example of such a rule is provided below.

```
allGrp (code == [+GoGreenNSInterior],
env == [NS_Red, EW_Red,
InsideGoGreenNS] -> env = env)
```

In some embodiments, a rule may be provided that clears an environment metadata variable if an instruction labeled with GoGreenNSEntry, GoGreenNSExit, or GoGreenNSInterior is attempted that does not match a corresponding rule. In this manner, control flow integrity may be maintained. For instance, control flow may enter a function only at the first instruction of the function. Additionally, or alternatively, control flow may exit a function only at the last instruction of the function.

In the above codePlusDataLightPol policy example, policy enforcement hardware maintains metadata in two ways. For instance, a metadata label comprising the symbol NS may be stored in the environment metadata variable (env) to indicate that the north-south lights are not red, and a metadata label [NS, Green] (or [NS, Yellow]) may be associated with a memory location of the global variable ns_street to indicate that that the north-south lights are green (or yellow). The inventors have recognized and appreciated that the environment metadata variable (env) may be used to make state information about a first set of lights (e.g., the east-west lights) available to a rule (e.g., the first rule in the codePlusDataLightPol policy) that checks state changes of a second set of lights (e.g., the north-south lights). However, it should be appreciated that aspects of the present disclosure are not limited to maintaining metadata in both ways.

In some embodiments, an additional information flow integrity policy may be provided to ensure that data values are not modified as the data values flow through application code and/or a run time environment (e.g., C run time). Accordingly, in some embodiments, a policy may be used that labels application data with a metadata symbol (e.g., Const) to indicate that the data is not to change. The policy may include rules that only allow instructions that do not modify the data value, such as load, store, and move instructions. Examples of such rules are provided below.

```
storeGrp(code == _, addr == _, val == [Const], mem == _ -> mem = [Const])
loadGrp(code == _, addr == _, mem == [Const] -> res = [Const])
moveGrp(code == _, op1 == [Const] -> res = [Const])
```

In some embodiments, the first rule may indicate that if a source register of a store instruction is labeled with Const, then a target memory location of the store instruction may also be labeled with Const upon completion of the store instruction. In some embodiments, the second rule may indicate that if a source memory location of a load instruction is labeled with Const, then a target register of the load instruction may also be labeled with Const upon completion of the load instruction. In some embodiments, the third rule may indicate that if a source register (or memory location) of a move instruction is labeled with Const, then a target register (or memory location) of the move instruction may also be labeled with Const upon completion of the move instruction.

As discussed above in connection with FIG. 2, a policy linker (e.g., the illustrative linker 225) may be provided to process object code, policy code, and/or a target description into an initialization specification. The initialization specification may in turn be used by a loader (e.g., the illustrative loader 215) to initialize a target system. For instance, the loader may, at load time, use the initialization specification to initialize metadata on application code.

In some embodiments, a target description may be provided for the above illustrative application code for a traffic light controller. The target description may describe a set of entities corresponding, respectively, to the go . . . functions. Such entity descriptions may be used by the policy linker to generate an initialization specification. Examples of entity descriptions are provided below.

```
entities:
    symbol: {
        name: requires.application.code.function.go_green_NS,
        elf_name: go_green_NS,
        tag_all: false
    }
    symbol: {
        name: requires.application.code.function.go_green_EW,
        elf_name: go_green_EW,
        tag_all: false
    }
    symbol: {
        name: requires.application.code.function.go_yellow_NS,
        elf_name: go_yellow_NS,
        tag_all: false
    }
    symbol: {
        name: requires.application.code.function.go_yellow_EW,
        elf_name: go_yellow_EW,
        tag_all: false
    }
    symbol: {
        name: requires.application.code.function.go_red_NS,
        elf_name: go_red_NS,
        tag_all: false
    }
    symbol: {
        name: requires.application.code.function.go_red_EW,
```

-continued

```
        elf_name: go_red_EW,
        tag_all: false
    }
```

It should be appreciated that an initialization specification may be generated in any suitable manner. For instance, source code analysis may be combined with one or more other techniques to automatically generate the initialization specification.

It also should be appreciated that examples relating to a traffic light controller are provided solely for purposes of illustration. The techniques described herein may be used to enforce any suitable safety property, and/or other types of properties, in any suitable target system.

Figure 5:
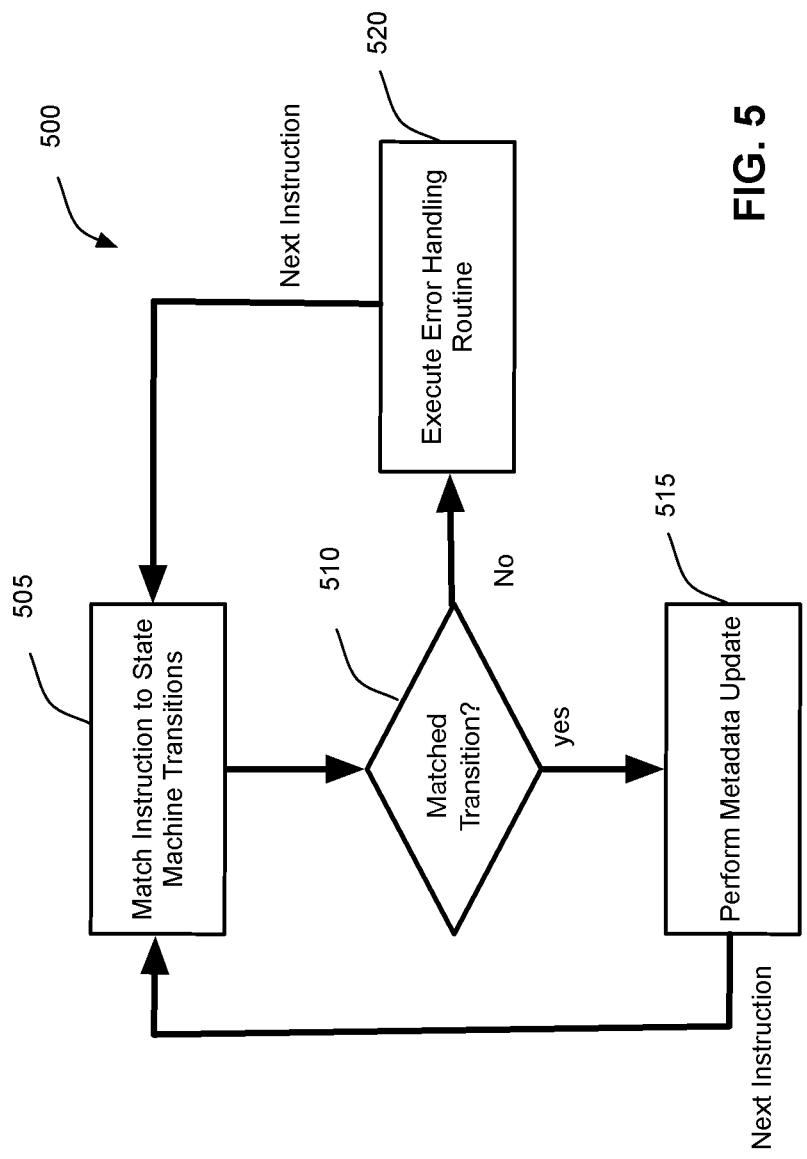
FIG. 5 shows an illustrative process 500 for executing an FSM in parallel with application code, in accordance with some embodiments.

FIG. 5 shows an illustrative process 500 for executing an FSM in parallel with application code, in accordance with some embodiments. For instance, the process 500 may be performed by policy enforcement hardware to execute the illustrative FSM 400 in the example of FIG. 4

In some embodiments, a policy language may be used to describe an FSM that models expected behavior of a system. For instance, the FSM may indicate safe states of the system to be protected, and/or allowed transitions among safe states, under a selected safety policy. At run time, policy enforcement hardware may execute the FSM in parallel with application code, thereby checking whether the system is complying with the safety policy.

In some embodiments, the policy enforcement hardware may maintain metadata for registers, memory locations, and/or dynamic environment of the system. For instance, an environment metadata element may be used to hold a current state of the FSM. Additionally, or alternatively, state information of the FSM may be stored in a metadata tag associated with an application memory location.

In some embodiments, the policy enforcement hardware may associate one or more portions of application code with appropriate metadata. For instance, one or more instructions may be indicative of a transition point during execution of the application code, and the policy enforcement hardware may associate the one or more instructions with metadata corresponding to a transition in the FSM. However, it should be appreciated that aspects of the present disclosure are not limited to associating application code with metadata. In some embodiments, a transition in the FSM may be indicated by a metadata pattern on one or more storage locations (e.g., a memory location and/or a register) storing data manipulated by application code. For instance, the ninth rule of the illustrative codePlusDataLightPol policy above may be triggered if a store instruction is attempting to modify the global variable ns_street (but the store instruction does not match any of the first eight rules), without regard to what, if any, metadata is associated with the store instruction itself.

In the example of FIG. 5, the policy enforcement hardware may, at act 505, match an instruction executed by a host processor against rules of a policy, which may correspond to transitions in the FSM. For instance, the rules may be stored in a rule cache (e.g., the illustrative rule cache 144 in the example of FIG. 1), and the policy enforcement hardware may query the rule cache to determine if the instruction matches any rule in the rule cache. If there is no matching rule in the rule cache, the policy enforcement hardware may request that a policy processor (e.g., the illustrative policy processor 150 in the example of FIG. 1) evaluate the instruction for compliance with the policy corresponding to the FSM.

If a matching rule is found in the rule cache, the enforcement hardware may determine, at act 510, that the instruction matches a transition of the FSM. The policy enforcement hardware may allow the instruction to proceed. Additionally, or alternatively, the policy enforcement hardware may, at act 515, perform one or more metadata updates according to the matching rule.

If there is no matching rule in the rule cache, but the policy processor indicates the instruction matches a rule of the policy, the enforcement hardware may also determine, at act 510, that the instruction matches a transition of the FSM. The policy enforcement hardware may install the matching rule returned by the policy processor into the rule cache for future reference.

If there is no matching rule in the rule cache, and the policy processor indicates the instruction does not match any rule of the policy, the enforcement hardware may determine, at act 510, that the instruction does not match any transition of the FSM. The policy enforcement hardware may proceed to act 520 to cause an appropriate violation handling routine to be executed. For instance, the policy enforcement hardware may generate an alert, block the instruction from executing, etc.

It should also be appreciated that the techniques disclosed herein may be implemented in any of numerous ways, as the disclosed techniques are not limited to any particular manner of implementation. Examples of details of implementation are provided solely for illustrative purposes. Furthermore, the disclosed techniques may be used individually or in any suitable combination, as aspects of the present disclosure are not limited to using any particular technique or combination of techniques.

For instance, policies (e.g., safety policies) may be created in one or more different ways. As one example, a policy may be coded directly in a policy language. As another example, a modeling tool for a certain application domain may be used to generate a policy. As another example, an FSM specification (e.g., in the form of a Unified Modeling Language, or UML, diagram) may be automatically translated into a policy.

Illustrative configurations of one or more aspects of the present disclosure are provided below.

Configuration 1. A system comprising enforcement hardware configured to: execute, at run time, a state machine in parallel with application code, comprising: maintaining metadata that corresponds to one or more state variables of the state machine; matching instructions in the application code to transitions in the state machine; and in response to determining that an instruction in the application code does not match any transition from a current state of the state machine, causing an error handling routine to be executed.

Configuration 2. The system of configuration 1, wherein: the state machine represents a safety property to be enforced while the application code is executed.

Configuration 3. The system of configuration 1, wherein executing the state machine in parallel with the application code further comprises: in response to determining that an instruction in the application code matches a transition from a current state of the state machine, performing a metadata update according to the match transition.

Configuration 4. The system of configuration 1, wherein causing an error handling routine to be executed comprises: generating an alert; and/or preventing the instruction from being executed.

Configuration 5. The system of configuration 1, wherein: the enforcement hardware comprises policy enforcement hardware configured to check run time behavior of the application against at least one policy; and the at least one policy comprising rules corresponding to transitions in the state machine.

Configuration 6. The system of configuration 5, wherein: the at least one policy comprises a safety policy; and the policy enforcement hardware is further configured to enforce a security policy, and/or is further configured to enforce a privacy policy.

Configuration 7. The system of configuration 6, wherein: the policy enforcement hardware is further configured to enforce the security policy; and the security policy comprises an information flow integrity policy.

Configuration 8. The system of configuration 1, wherein: maintaining metadata comprises associating metadata with an instruction in the application code; and the enforcement hardware is configured to match the instruction in the application code to a transition in the state machine based on the metadata associated with the instruction.

Configuration 9. The system of configuration 1, wherein: maintaining metadata comprises associating metadata with a storage location storing data manipulated by an instruction in the application code; and the enforcement hardware is configured to match the instruction in the application code to a transition in the state machine based on the metadata associated with the storage location.

Configuration 10. A system comprising at least one processor and at least one non-transitory computer-readable medium having encoded thereon instructions which, when executed by the at least one processor, perform a method comprising: translating a description of a state machine into at least one policy to be enforced at run time based on metadata labels associated with application code and/or data manipulated by the application code.

Configuration 11. The system of configuration 10, wherein: the state machine represents a safety property to be enforced while the application code is executed.

Configuration 12. The system of configuration 10, wherein translating the description of the state machine comprises: assigning a metadata symbol to a value of a state variable of the state machine.

Configuration 13. The system of configuration 10, wherein translating the description of the state machine comprises: translating a transition of the state machine into a rule of the policy.

Configuration 14. A method performed by the system of any of the above configurations.

Configuration 15. At least one non-transitory computer-readable medium having encoded thereon instructions which, when executed by at least one processor, perform the method of configuration 14.

Configuration 16. A system comprising at least one processor and at least one non-transitory computer-readable medium having encoded thereon instructions which, when executed by the at least one processor, perform a method comprising translating a safety policy specification into rules to be enforced at runtime based on metadata labels of instructions and/or data manipulated by the instructions.

Configuration 17. The system of configuration 16, wherein the safety policy specification comprises a finite state machine specification.

Configuration 18. A system comprising at least one processor and at least one non-transitory computer-readable medium having encoded thereon instructions which, when executed by the at least one processor, perform a method comprising enforcing at least one safety policy at runtime based on metadata labels of instructions and/or data manipulated by the instructions.

Configuration 19. The system of configuration 18, wherein the at least one safety policy is enforced along with at least one security policy.

Configuration 20. The system of configuration 19, wherein the least one security policy comprises an information flow integrity policy.

Configuration 21. The system of configuration 18, wherein the at least one safety policy is enforced along with at least one privacy policy.

FIG. 6 shows, schematically, an illustrative computer 1100 on which any aspect of the present disclosure may be implemented.

In the embodiment shown in FIG. 6, the computer 1100 includes a processing unit 1101 having one or more processors and a non-transitory computer-readable storage medium 1102 that may include, for example, volatile and/or non-volatile memory. The memory 1102 may store one or more instructions to program the processing unit 1101 to perform any of the functions described herein. The computer 1100 may also include other types of non-transitory computer-readable medium, such as storage 1105 (e.g., one or more disk drives) in addition to the system memory 1102. The storage 1105 may also store one or more application programs and/or resources used by application programs (e.g., software libraries), which may be loaded into the memory 1102.

The computer 1100 may have one or more input devices and/or output devices, such as devices 1106 and 1107 illustrated in FIG. 6. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 1107 may include a microphone for capturing audio signals, and the output devices 1106 may include a display screen for visually rendering, and/or a speaker for audibly rendering, recognized text.

In the example shown in FIG. 6, the computer 1100 also includes one or more network interfaces (e.g., the network interface 1110) to enable communication via various networks (e.g., the network 1120). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system comprising enforcement hardware configured to:
   execute, at run time, a state machine in parallel with application code, comprising:
   maintaining metadata that corresponds to one or more state variables of the state machine;
   matching instructions in the application code to transitions in the state machine; and
   in response to determining that an instruction in the application code does not match any transition from a current state of the state machine, causing an error handling routine to be executed, wherein:
   the enforcement hardware comprises policy enforcement hardware configured to check run time behavior of the application code against at least one policy; and
   the at least one policy comprises rules corresponding to transitions in the state machine.

2. The system of claim 1, wherein:
   the state machine represents a safety property to be enforced while the application code is executed.

3. The system of claim 1, wherein:
   the instruction comprises a first instruction; and
   executing the state machine in parallel with the application code further comprises:
   in response to determining that a second instruction in the application code matches a transition from a current state of the state machine, performing a metadata update according to the matched transition.

4. The system of claim 1, wherein causing an error handling routine to be executed comprises:
   generating an alert; and/or
   preventing the instruction from being executed.

5. The system of claim 1, wherein:
   the at least one policy comprises a safety policy; and
   the policy enforcement hardware is further configured to enforce a security policy, and/or is further configured to enforce a privacy policy.

6. The system of claim 5, wherein:
   the policy enforcement hardware is further configured to enforce the security policy; and
   the security policy comprises an information flow integrity policy.

7. The system of claim 1, wherein:
   maintaining metadata comprises associating metadata with the instruction in the application code; and
   the enforcement hardware is configured to attempt to match the instruction in the application code to a transition in the state machine based on the metadata associated with the instruction.

8. The system of claim 1, wherein:
   maintaining metadata comprises associating metadata with data manipulated by the instruction in the application code; and
   the enforcement hardware is configured to attempt to match the instruction in the application code to a transition in the state machine based on the metadata associated with the data manipulated by the instruction.

9. A method implemented by a system comprising enforcement hardware, the method comprising an act of:
   executing, at run time, a state machine in parallel with application code, comprising:
   maintaining metadata that corresponds to one or more state variables of the state machine;
   matching instructions in the application code to transitions in the state machine; and
   in response to determining that an instruction in the application code does not match any transition from a current state of the state machine, causing an error handling routine to be executed, wherein:
   the enforcement hardware comprises policy enforcement hardware configured to check run time behavior of the application code against at least one policy; and
   the at least one policy comprises rules corresponding to transitions in the state machine.

10. The method of claim 9, wherein:
    the state machine represents a safety property to be enforced while the application code is executed.

11. The method of claim 9, wherein:
    the instruction comprises a first instruction; and
    executing the state machine in parallel with the application code further comprises:

in response to determining that a second instruction in the application code matches a transition from a current state of the state machine, performing a metadata update according to the matched transition.

12. The method of claim 9, wherein causing an error handling routine to be executed comprises:
generating an alert; and/or
preventing the instruction from being executed.

13. The method of claim 9, wherein:
the at least one policy comprises a safety policy; and
the policy enforcement hardware is further configured to enforce a security policy, and/or is further configured to enforce a privacy policy.

14. The method of claim 13, wherein:
the policy enforcement hardware is further configured to enforce the security policy; and
the security policy comprises an information flow integrity policy.

15. The method of claim 9, wherein:
maintaining metadata comprises associating metadata with the instruction in the application code; and
matching instructions in the application code to transitions in the state machine comprises attempting to match the instruction in the application code to a transition in the state machine based on the metadata associated with the instruction.

16. The method of claim 9, wherein:
maintaining metadata comprises associating metadata with data manipulated by the instruction in the application code; and
matching instructions in the application code to transitions in the state machine comprises attempting to match the instruction in the application code to a transition in the state machine based on the metadata associated with the data manipulated by the instruction.

17. At least one non-transitory computer-readable medium having encoded thereon instructions configured to program at least one processor to perform a method comprising an act of:
executing, at run time, a state machine in parallel with application code, comprising:
maintaining metadata that corresponds to one or more state variables of the state machine;
matching instructions in the application code to transitions in the state machine; and
in response to determining that an instruction in the application code does not match any transition from a current state of the state machine, causing an error handling routine to be executed, wherein:
the at least one processor is programmed to check run time behavior of the application code against at least one policy; and
the at least one policy comprises rules corresponding to transitions in the state machine.

18. The at least one non-transitory computer-readable medium of claim 17, wherein:
the state machine represents a safety property to be enforced while the application code is executed.

19. The at least one non-transitory computer-readable medium of claim 17, wherein:
the instruction comprises a first instruction; and
executing the state machine in parallel with the application code further comprises:
in response to determining that a second instruction in the application code matches a transition from a current state of the state machine, performing a metadata update according to the matched transition.

20. The at least one non-transitory computer-readable medium of claim 17, wherein causing an error handling routine to be executed comprises:
generating an alert; and/or
preventing the instruction from being executed.

21. The at least one non-transitory computer-readable medium of claim 17, wherein:
the at least one policy comprises a safety policy; and
the at least one processor is further programmed to enforce a security policy, and/or is further programmed to enforce a privacy policy.

22. The at least one non-transitory computer-readable medium of claim 17, wherein:
the at least one processor is further programmed to enforce the security policy; and
the security policy comprises an information flow integrity policy.

23. The at least one non-transitory computer-readable medium of claim 17, wherein:
maintaining metadata comprises associating metadata with the instruction in the application code; and
the at least one processor is programmed to attempt to match the instruction in the application code to a transition in the state machine based on the metadata associated with the instruction.

24. The at least one non-transitory computer-readable medium of claim 17, wherein:
maintaining metadata comprises associating metadata with data manipulated by the instruction in the application code; and
the at least one processor is programmed to attempt to match the instruction in the application code to a transition in the state machine based on the metadata associated with the data manipulated by the instruction.

25. The at least one non-transitory computer-readable medium of claim 17, wherein:
the at least one processor comprises at least one field-programmable gate array (FPGA).

* * * * *